Oct. 25, 1938.  A. G. HOPKINS  2,134,128
SPOOL COVER
Filed Aug. 22, 1933  3 Sheets-Sheet 1
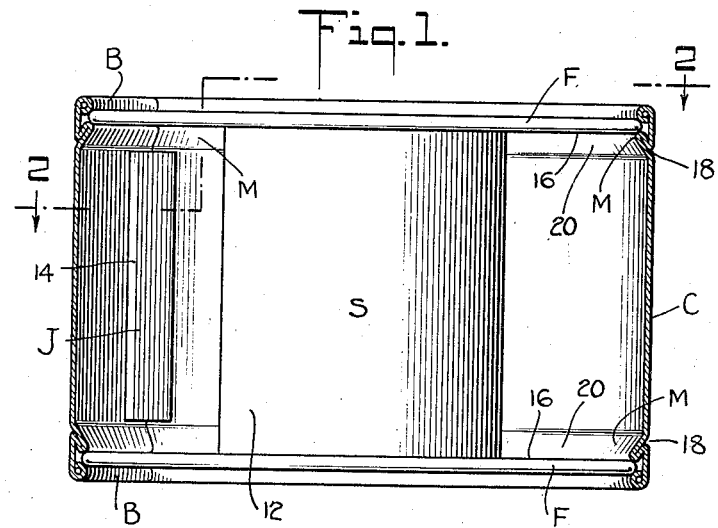
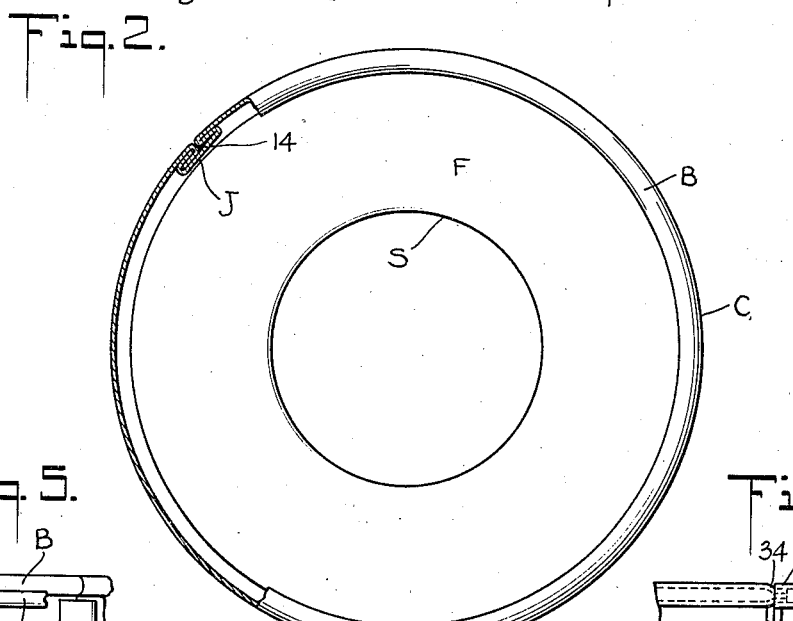
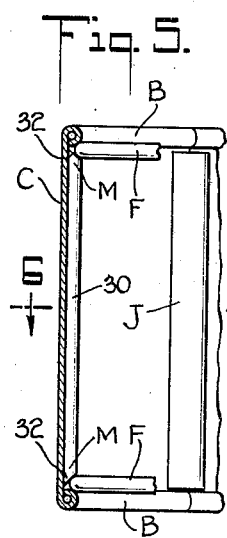
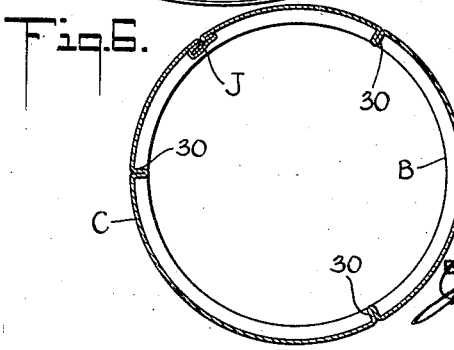
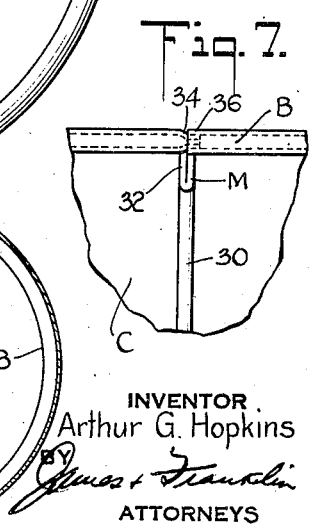
INVENTOR
Arthur G. Hopkins
ATTORNEYS Oct. 25, 1938.  A. G. HOPKINS  2,134,128
SPOOL COVER
Filed Aug. 22, 1933  3 Sheets-Sheet 2
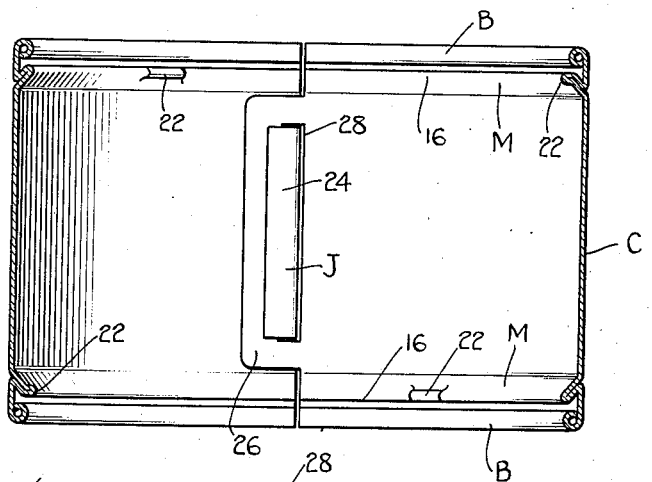
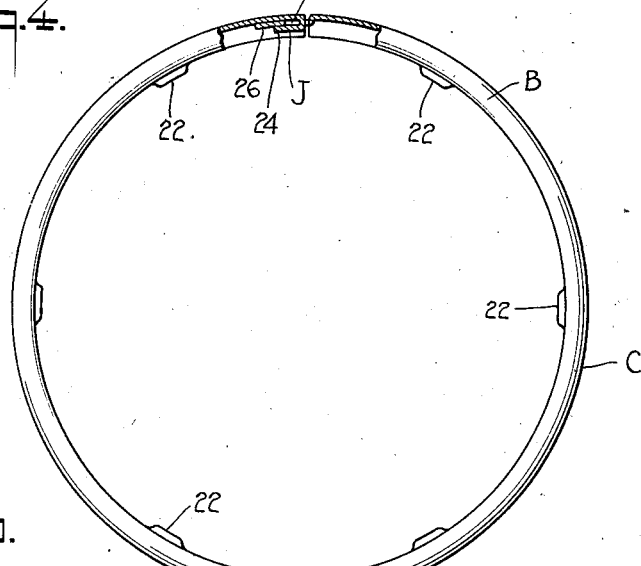
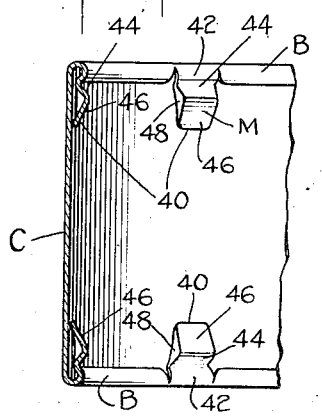
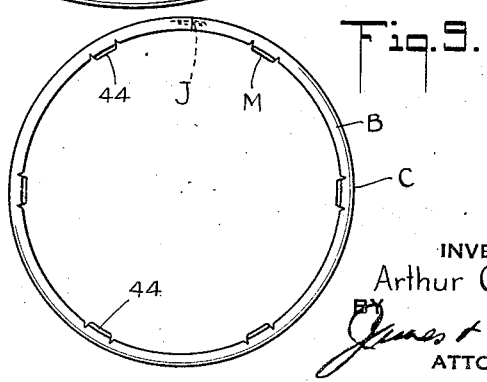
INVENTOR
Arthur G. Hopkins
ATTORNEYS

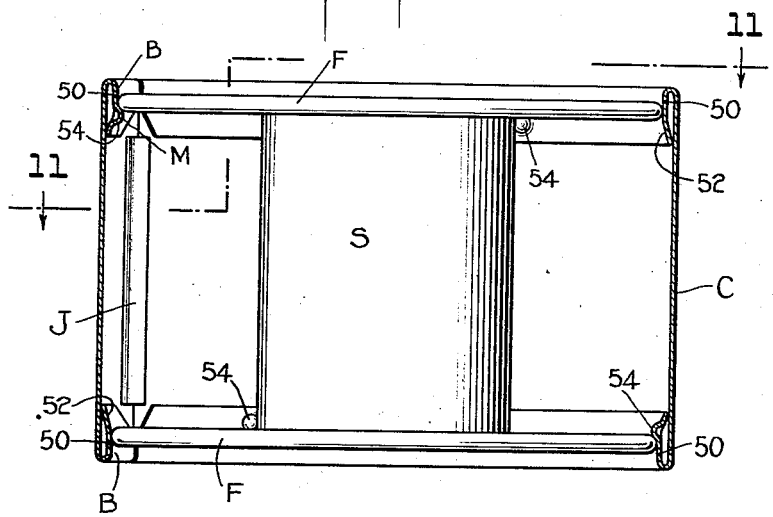
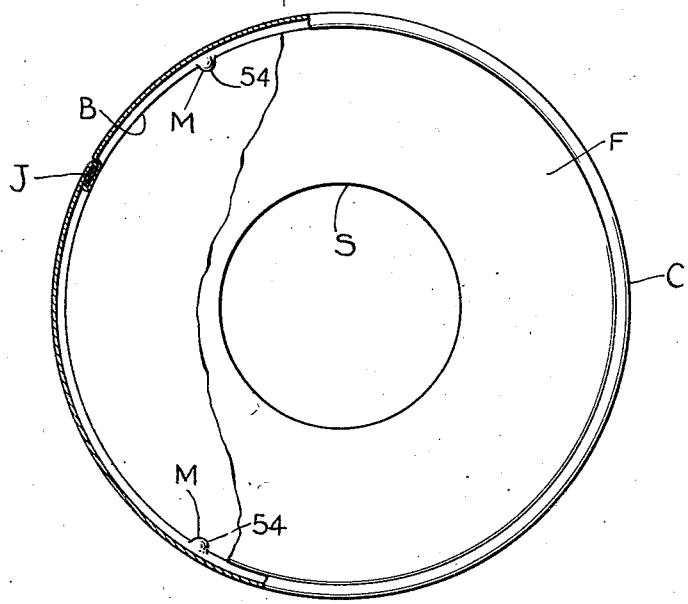

Patented Oct. 25, 1938

2,134,128

UNITED STATES PATENT OFFICE 2,134,128

SPOOL COVER

Arthur G. Hopkins, Maspeth, N. Y., assignor to McKeesport Tin Plate Corporation, a corporation of Delaware Application August 22, 1933, Serial No. 686,210

16 Claims. (Cl. 206—52)

This invention relates to spool covers and more particularly to the sheet metal covers or casings employed to receive and house spools of surgical adhesive tape.

One general object of the present invention resides in the provision of a spool cover which will have a smooth and continuous exterior surface and which, when combined with the spool, will form an assembly or package having smooth and continuous peripheral and side walls. A more specific object is to provide a spool cover the seams of which will all be located within the cylindrical surface of the cover, and a related object is to provide a spool cover adapted to receive and hold a spool the flanges of which have a diameter substantially smaller than the overall diameter of the cover. Still further objects of my invention reside in the provision of a cover and spool so related as to provide for smooth engagement and disengagement of the spool with the cover; to afford through passage of the spool in the cover so that the spool may be inserted in or removed from the cover from either direction; and nevertheless to hold and locate the spool in definite location with a sufficiently secure grip. Still further objects of the present invention reside in the provision of a spool cover made of a single piece of relatively light-gauge sheet metal, yet which will be rigid and strong, and self-supporting in construction.

To the accomplishment of the foregoing and such other objects as will hereinafter appear, my invention consists in the spool and spool cover elements and their relation one to the other as hereinafter are more particularly described in the specification and sought to be defined in the claims. The specification is accompanied by drawings in which:

Fig. 1 is a section taken through one form of spool cover embodying features of my invention, showing the spool in place;

Fig. 2 is a partially sectioned side elevation taken in the plane of the line 2—2 in Fig. 1;

Fig. 3 is a section through a modified form of spool cover provided with a slip joint;

Fig. 4 is a partially sectioned side elevation of the same;

Fig. 5 is a partial section of still another form of spool cover showing the spool flanges in place;

Fig. 6 is a section through the said spool cover, this section being taken in the plane of the line 6—6 of Fig. 5;

Fig. 7 is a detail of the spool cover;

Fig. 8 is a partial view of a section taken through still another form of spool cover embodying features of my invention;

Fig. 9 is a side elevation of the same;

Fig. 10 is a section through another form of spool and spool cover assembly; and Fig. 11 is a section taken in the plane of the line 11—11 in Fig. 10.

Referring to the drawings and to all forms of the invention shown, the assembly comprises a spool S having flanges F, the spool being received in and housed by a spool cover C, the spool cover being substantially larger in diameter than the flanges F. The spool cover has a smooth and continuous exterior surface, and to this end the seam or joint J connecting the ends of the same is located internally of the cover. The spool is held within the cover, despite the difference in diameter therebetween, by appropriate means also located internally of the cover and exemplified by edge beads B rolled inwardly at the ends of the cover, and cooperating means M located within the edge beads B and serving in combination therewith to locate the flanges F of the spool cover.

Considering the invention in greater detail and referring first to Figs. 1 and 2, the spool S may be of conventional type comprising a center core or body 12 and flanges or ends F secured thereto. It is preferably of a type in which the ends or flanges F have a smooth flat outer wall, such a spool being disclosed, for example, in my Patent No. 1,951,151, issued March 13, 1934.

The cover C is rolled up out of a single piece of sheet metal, and the meeting ends are joined in an interlocking seam 14 which, as is clearly shown in Figs. 1 and 2, is located entirely within the periphery of the cover, thereby permitting the exterior of the cover to retain a smooth and continuous cylindrical shape. The over-all diameter of the cover, instead of differing from that of the spool by only the relatively slight thickness of the sheet metal, differs substantially therefrom, thereby providing ample clearance for the seam 14 without in any way interfering with free passage of the spool through the cover.

To locate the spool within the cover despite the increased diameter of the cover, the spool is held by support means projecting substantially inwardly of the cover. In the present case the edges of flanges F are received between beads B, rolled or curled inwardly from the edges or ends of the cover, and annular ribs 16 folded inwardly from the surface of the cover and extending in parallel relation to and just inside of the beads B. In practice the fold for the ribs 16 is preferably taken a substantial distance inwardly of the ends of the cover, as is shown at 18, but the rib is made of excess width and is bent outwardly to bring its inner edge 16 relatively near the beads B. In this manner a broad sloping surface 20 is provided, diverging from the edge 16 toward the middle of the cover. In this manner not only is construction of the cover simplified, but a bearing surface is provided to guide the approaching leading flange of the spool into place as the spool is forced into the cover.

In passing, it may be noted that the seam 14 terminates just inside of the ribs 16, thereby simplifying the seam, which is taken only on the flat surface of the cover, and bringing the ends of the beads B and ribs 16 into simple abutting relation, resulting in a continuous circular shape which mates accurately with the spool flanges.

A slightly modified form of this spool cover is shown in Figs. 3 and 4 referring to which it will be observed that the modification lies in two features: first in the joint J, and secondly in the provision of nibs 22. The general arrangement of the cover is similar to that already described, it comprising edge beads B and collateral annular ribs 16 for engaging the spool. The seam or connection J, instead of being a rigid interlocking seam, is a slip joint consisting of a broad hook member 24 and a slotted mating member 26, the hook 24 passing through slot 28. The slip joint is located internally of the cover, as is best brought out in Fig. 4, and is secured during passage of the spool by reason of the difference in diameter between the spool and the cover. In the present case when the spool is forced into or out of the cover, the cover may yield slightly due to the slip joint, and the resilient engagement of the spool and cover is therefore determined by the resistance of the cover to bending about a section therethrough. This construction affords a free and smooth mating of the parts without necessitating extreme accuracy of dimension.

The grip of the cover on the spool may, if desired, be increased by the provision of nibs 22 pinched inwardly on the edges of the ribs 16. In the present case three such nibs are provided on each rib 16, and the nibs are distributed in alternation. It will be understood that either the slip joint feature or the use of locating nibs may be employed separately as well as together, or, in other words, that the form of the invention shown in Fig. 1 may, if desired, be modified to use the locating nibs 22 without using the slip joint, and vice versa.

The form of the invention shown in Figs. 5, 6 and 7 differs from those heretofore described in that the additional means M, cooperating with the edge beads B for locating the spool flanges F, consists of longitudinal rather than annular ribs. The peripheral wall of the cover is folded inwardly to form a plurality, in this case three, longitudinal ribs 30 which act as guide rails for the spool during its passage through the cover. The ends 32 of the rails terminate inside of the edge beads B and are preferably biased, as is clearly shown in Fig. 5, to provide tapering surfaces to receive and hold the spool flanges in place. It will be noted from inspection of Fig. 6 that the depth or width of the ribs or rails 30 is greater than the thickness of the internal seam J, thus affording clearance during passage of the spool through the cover. The ends of the bead B at each of the joints may come into simple butt-joint relation or, if desired, may be inter-engaged in the manner shown in Fig. 7 in which the end 34 is compressed and fitted into the open end 36.

Still another form of my invention is shown in Figs. 8 and 9 of the drawings. In this form of the invention the cover is curled inwardly at its edges to form the edge beads B, but the additional means M, cooperating therewith to hold the spool, consists of a plurality, say, six, tabs 40 which are formed integrally with and project inwardly from the curled edge of the cover. Each of the tabs 40 comprises an outer portion 42 which is curled and shaped as a continuation of the bead, an intermediate portion 44 which is depressed outwardly to form a groove or channel for receiving and holding the spool flange, and an approach portion 46 which presents a sloping or inclined surface from the inner wall of the spool toward the intermediate or channel portion 44. If desired, additional metal may be provided and folded outwardly to constitute side finishing walls 48 for each of the tabs. It will be evident that with this construction the spool may be forced into place with a smooth engagement because the leading flange of the spool is guided into place within the cover by the sloping approach surfaces 46 of the tabs.

Another and especially attractive form of my invention, because of its simplicity in construction, is shown in Figs. 10 and 11 of the drawings. The spool cover is made of a single piece of sheet metal rolled into cylindrical form and joined at the seam or joint J. The exterior of the cover is perfectly straight and smooth and, as before, is substantially larger in diameter than the spool flanges F. The edges of sheet metal are rolled inwardly to form short cylindrical lining walls 50 having a diameter practically equal to that of the spool flanges F. Within the cylindrical portions 50 the inturned metal is flared outwardly to form a tapered approach portion 52. A number of dots or teats 54, in this case three, are struck inwardly around the inner terminal of the lining portion 50, these being located within flanges F and serving to determine the position of the spool within the cover. It will be understood that the flare or taper of portions 52 provides easy passage of the spool through the cover. The seam J causes no interference because, while inside the outer surface of the cover, the seam is nevertheless outside of the spool flanges, all due to the difference in diameter between the cover and the spool, as has heretofore been explained.

It is believed that the construction as well as the many advantages of my improved spool cover will be apparent from the foregoing detailed description thereof. The spool cover has a smooth and continuous cylindrical surface. All seams, channels, ribs, and the like are located within the spool cover, yet clearance is provided for free passage of the spool entirely through the cover from either direction. The cover is made of a single piece of sheet metal and yet is relatively strong and rigid, it being strengthened and rigidified by the various beads and ribs provided thereon.

It will be apparent that while I have shown and described my invention in preferred forms, many changes and modifications may be made in the structures disclosed, without departing from the spirit of the invention, defined in the following claims.

I claim:

1. A sheet metal tape spool cover comprising a single piece of sheet metal rolled up into cylindrical form and having a smooth cylindrical exterior, the meeting edges of the sheet metal being joined in a side seam disposed internally of the cover, and means on the inside of the cylindrical cover to engage and hold the flanges of a spool the said flanges of which are smaller in radius than the radius of the cover by an amount equal to or greater than the internal projection or thickness of the aforesaid side seam, said means being so designed that the spool may be moved through the cover in either direction and including edge beads turned inwardly at the ends of the cover and additional means disposed inside said cover and axially within said edge beads and cooperating therewith to support and locate the spool, said additional means being annular ribs folded inwardly from the body of the cover and extending in parallel relation to the adjacent edge beads.

2. A sheet metal tape spool cover comprising a single piece of sheet metal of cylindrical form and having a smooth cylindrical exterior, the meeting edges of the sheet metal being joined in a side seam disposed internally of the cover, and means on the inside of the cylindrical cover to engage and hold the flanges of a spool the said flanges of which are smaller in radius than the radius of the cover by an amount equal to or greater than the internal projection or thickness of the aforesaid side seam, said means being so designed that the spool may be moved through the cover in either direction and including edge beads rolled inwardly at the ends of the cover and additional means disposed inside said cover and axially within said edge beads and cooperating therewith to support and locate the spool, said additional means being annular ribs folded inwardly from the body of the cover and extending in parallel relation to the adjacent edge beads, said ribs diverging inwardly toward the center of the cover.

3. A sheet metal tape spool cover comprising a single piece of sheet metal rolled up into cylindrical form and having a smooth cylindrical exterior, the meeting edges of the sheet metal being joined in a side seam disposed internally of the cover, and means on the inside of the cylindrical cover to engage and hold the flanges of a spool the said flanges of which are smaller in radius than the radius of the cover by an amount equal to or greater than the internal projection or thickness of the aforesaid side seam, said means being so designed that the spool may be moved through the cover in either direction and including edge beads rolled inwardly at the ends of the cover and additional means disposed within said edge beads and cooperating therewith to support and locate the spool, said additional means being annular ribs folded inwardly from the body of the cover and extending in parallel relation to the adjacent edge beads, said ribs diverging inwardly toward the center of the cover, and having a plurality of ribs pressed inwardly therefrom.

4. A sheet metal tape spool cover comprising a single piece of sheet metal rolled up into cylindrical form and having a smooth cylindrical exterior, the meeting edges of the sheet metal being joined by a side seam disposed internally of the cover, and means on the inside of the cylindrical cover to engage and hold the flanges of a spool the said flanges of which are smaller in radius than the radius of the cover by an amount equal to or greater than the internal projection or thickness of the aforesaid side seam, said means being so designed that the spool may be moved through the cover in either direction and including edge beads rolled inwardly at the ends of the cover and additional means disposed inside said cover and axially within said edge beads and cooperating therewith to support and locate the spool, the side seam joining the ends of the cover being a slip joint which facilitates expansion of the cover.

5. A sheet metal tape spool cover comprising a single piece of sheet metal rolled up into cylindrical form and having a smooth cylindrical exterior, the meeting edges of the sheet metal being joined by a side seam disposed internally of the cover, and means on the inside of the cylindrical cover to engage and hold the flanges of a spool the said flanges of which are smaller in radius than the radius of the cover by an amount equal to or greater than the internal projection or thickness of the aforesaid side seam, said means being so designed that the spool may be moved through the cover in either direction and including edge beads rolled inwardly at the ends of the cover and additional means disposed axially within said edge beads and cooperating therewith to support and locate the spool, said additional means being annular ribs folded inwardly from the body of the cover and extending in parallel relation to the adjacent edge beads, the side seam joining the ends of the cover being a slip joint which facilitates expansion of the cover.

6. A sheet metal tape spool cover comprising a single piece of sheet metal of cylindrical form and having a smooth cylindrical exterior, the meeting edges of the sheet metal being joined in a side seam disposed internally of the cover, and means on the inside of the cylindrical cover to engage and hold the flanges of a spool the said flanges of which are substantially smaller in diameter than the diameter of the cover, said means being so designed that the spool may be moved through the cover in either direction and including edge beads rolled inwardly at the ends of the cover and additional means disposed axially within said edge beads and cooperating therewith to support and locate the spool, said additional means being annular ribs folded inwardly from the body of the cover and extending in parallel relation to the adjacent edge beads, said ribs diverging inwardly toward the center of the cover, the connection joining the ends of the cover being a slip joint which facilitates expansion of the cover.

7. A sheet metal tape spool cover comprising a single piece of sheet metal rolled up into cylindrical form and having a smooth cylindrical exterior, the meeting edges of the sheet metal being joined in a side seam disposed internally of the cover, and means on the inside of the cylindrical cover to engage and hold the flanges of a spool the said flanges of which are smaller in radius than the radius of the cover by an amount equal to or greater than the internal projection or thickness of the aforesaid side seam, said means being so designed that the spool may be moved through the cover in either direction and including edge beads rolled inwardly at the ends of the cover and additional means disposed axially between said edge beads and cooperating therewith to support and locate the spool, said means being a plurality of ribs struck inwardly longitudinally of the cover, the ends of said ribs terminating inside of the edge beads and being appropriately related thereto to locate the spool flanges.

8. A sheet metal tape spool cover comprising a single piece of sheet metal of cylindrical form and having a smooth cylindrical exterior, the meeting edges of the sheet metal being joined in a side seam disposed internally of the cover, and means on the inside of the cylindrical cover to engage and hold the flanges of a spool the said flanges of which are smaller in radius than the radius of the cover by an amount equal to or greater than the internal projection or thickness of the aforesaid side seam, said means being so designed that the spool may be moved through the cover in either direction and including edge beads rolled inwardly at the ends of the cover and additional means disposed axially between said edge beads and cooperating therewith to support and locate the spool, said means being a plurality of ribs struck inwardly longitudinally of the cover, the ends of said ribs terminating inside of the edge beads and being appropriately related thereto to locate the spool flanges.

9. A sheet metal tape spool cover comprising a single piece of sheet metal rolled up into cylindrical form and having a smooth cylindrical exterior, the meeting edges of the sheet metal being joined in a side seam disposed internally of the cover, and means on the inside of the cylindrical cover to engage and hold the flanges of a spool the said flanges of which are smaller in radius than the radius of the cover by an amount equal to or greater than the internal projection or thickness of the aforesaid side seam, said means being so designed that the spool may be moved through the cover in either direction, said means including edge beads turned inwardly at the ends of the cover and additional means disposed inside said cover and axially within said edge beads and cooperating therewith to support and locate the spool, said means being formed integrally with the edge beads and disposed inwardly therefrom.

10. A sheet metal tape spool cover comprising a single piece of sheet metal of cylindrical form and having a smooth cylindrical exterior, the meeting edges of the sheet metal being joined in a side seam disposed internally of the cover, and means on the inside of the cylindrical cover to engage and hold the flanges of a spool the said flanges of which are smaller in radius than the radius of the cover by an amount equal to or greater than the internal projection or thickness of the aforesaid side seam, said means including edge beads rolled inwardly at the ends of the cover and additional means disposed within said edge beads and cooperating therewith to support and locate the spool, said means being formed integrally with the edge beads and disposed inwardly therefrom, the innermost edge sloping outwardly or diverging toward the center of the spool cover.

11. A sheet metal tape spool cover comprising a single piece of sheet metal of cylindrical form and having a smooth cylindrical exterior, the meeting edges of the sheet metal being joined in a side seam disposed internally of the cover, and means on the inside of the cylindrical cover to engage and hold the flanges of a spool the said flanges of which are smaller in radius than the radius of the cover by an amount equal to or greater than the internal projection or thickness of the aforesaid side seam, said means including edge beads turned inwardly at the ends of the cover and additional means disposed within said edge beads and cooperating therewith to support and locate the spool, said means consisting of an outwardly flared continuation of the sheet metal of the beads forming an approach between the inside of the cover and the beads, and dots or teats struck inwardly at spaced points about the approach and bearing against the flanges of the spool in order to fix the same axially in the cover.

12. A sheet metal tape spool cover comprising a single piece of sheet metal rolled up into cylindrical form, the meeting edges of the sheet metal being joined in a side seam disposed internally of the cover, and means on the inside of the cylindrical cover to engage and hold the flanges of a spool the said flanges of which are smaller in radius than the radius of the cover by an amount equal to or greater than the internal projection or thickness of the aforesaid side seam, said means including the peripheral edges of said cover which are turned inwardly within the cover to form bearing surfaces substantially equal in diameter to the diameter of the spool flanges, and dots or teats struck inwardly at spaced points from the aforesaid bearing surfaces to locate the spool flanges in place within the spool cover.

13. A sheet metal tape spool cover comprising a single piece of sheet metal rolled up into cylindrical form, the meeting edges of the sheet metal being joined in a side seam disposed internally of the cover, and means on the inside of the cylindrical cover to engage and hold the flanges of a spool the said flanges of which are smaller in radius than the radius of the cover by an amount equal to or greater than the internal projection or thickness of the aforesaid side seam, said means including the peripheral edges of said cover which are turned inwardly within the cover to form bearing surfaces substantially equal in diameter to the diameter of the spool flanges, the innermost edges of the bearing surfaces being flared outwardly to form tapered approaches for the spool flanges, and dots or teats struck inwardly at spaced points from the aforesaid bearing surfaces to locate the spool flanges in place within the spool cover.

14. A sheet metal tape spool cover comprising a single piece of sheet metal rolled up into cylindrical form, the meeting edges of the sheet metal being joined in an axially directed seam disposed internally of the cover, and means on the inside of the cylindrical cover to engage and hold the flanges of a spool the said flanges of which are smaller in radius than the radius of the cover by an amount equal to or greater than the internal projection or thickness of the aforesaid side seam, said means being so designed that the spool may be moved through the cover in either direction and including the peripheral edges of said cover which are reversely folded inwardly within the cover to form relatively wide bearing surfaces substantially equal in diameter to the diameter of the spool flanges, the innermost edges of the bearing surfaces being pressed against the interior surface of the cover in order to form approaches for the spool flanges which will not obstruct the passage of the spool flanges through the cover, and projections struck inwardly at spaced points from the aforesaid bearing surfaces to locate the spool flanges in place within the spool cover.

15. A sheet metal tape spool cover comprising a single piece of sheet metal rolled up into cylindrical form and having a smooth cylindrical exterior, the meeting edges of the sheet metal being joined in a side seam disposed internally of the cover, and means on the inside of the cylindrical cover to engage and hold a spool the flanges of which have a radius smaller than the internal radius of the cover by an amount equal to or greater than the internal projection or thickness of the aforesaid side seam, said means being so designed that the spool may be moved through the cover in either direction and including edge beads turned inwardly at the ends of the cover, and additional means disposed inside said cover and axially within said edge beads and cooperating therewith to support and locate the spool.

16. In combination, a sheet metal tape spool cover and a tape spool received and protectively housed thereby, said cover comprising a single piece of sheet metal rolled up into cylindrical form and having a smooth cylindrical exterior, the meeting edges of the sheet metal being joined in a side seam disposed internally of the cover, said tape spool including end flanges the radius of which is smaller than the internal radius of the cover by an amount equal to or greater than the internal projection or thickness of the aforesaid side seam, and means on the inside of the cylindrical cover to engage and hold the flanges of the spool, said means being so designed that the spool may be moved through the cover in either direction and including edge beads turned inwardly at the ends of the cover, and additional means disposed inside said cover and axially within said edge beads and cooperating therewith to support and locate the spool.

ARTHUR G. HOPKINS.